Feb. 3, 1931.  J. E. HILL  1,790,663
THRASHING MACHINE
Filed Nov. 29, 1927

Inventor
James E. Hill
By Cushman Bryant & Darby
Attorneys

Patented Feb. 3, 1931

1,790,663

UNITED STATES PATENT OFFICE

JAMES E. HILL, OF PEORIA, ILLINOIS, ASSIGNOR TO AVERY POWER MACHINERY CO., OF PEORIA, ILLINOIS, A CORPORATION OF ILLINOIS

THRASHING MACHINE

Application filed November 29, 1927. Serial No. 236,508.

The present invention relates to improvements in thrashing machines, and particularly to means located adjacent the thrashing cylinder for assisting in separating the grain and straw.

Various forms of beaters have been heretofore provided for this general purpose, but the present improvements have been found to be more effective and efficient in operation than the constructions heretofore proposed.

Figure 1:
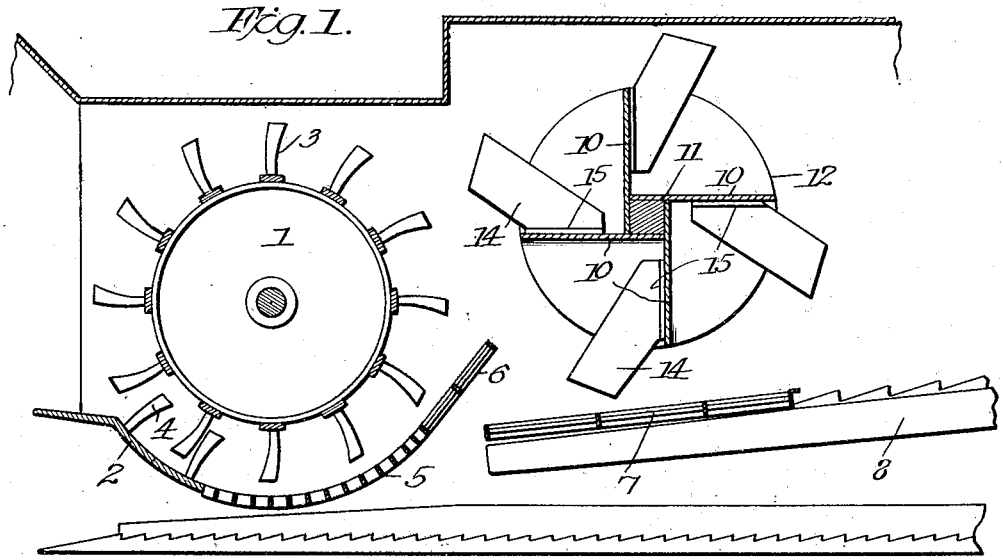
Figure 1 is a longitudinal section through a portion of a thrashing mechanism embodying the present improvements.

Referring to the drawing, in the several figures of which corresponding parts are designated by the same reference characters, 1 designates the thrashing cylinder and 2 the concave commonly associated with such a cylinder. These parts may be of any type or form, and it should be understood that although I have chosen to illustrate them as respectively provided with teeth 3, 4, that is not essential. A suitable grate is arranged beneath and behind the thrashing cylinder rearward of the concave 2, and in the illustrated construction this cylinder grate is shown as consisting of two sections, the forward one, 5, of which has its bars extending substantially parallel to the axis of the cylinder while the rear grate section 6 has its bars or rods extending transversely of the length of the cylinder axis. This construction also is not essential to my invention, as any other form of cylinder grate suitable for use with my improved beater may be used.

The straw passing over the rear edge of the grate section 6 is delivered onto the forward end portion of a straw rack 8, which may be of ordinary construction, and is preferably, though not necessarily, provided with a grate 7 that extends over the forward portion thereof. In passing over the cylinder grate 6, and on to and over the forward portion of the straw rack, the straw is subjected to the action of the rotary beater which is the particular subject of the present invention.

As shown, this beater consists of a plurality of longitudinally disposed wings 10, mounted on a common central shaft 11, and connected at their ends to head plates 12.

To each of the wings 10 of the beater are attached a plurality of members 14 spaced apart, in the form of separate blades or paddles, which project beyond the outer edge of the wing and act to exert a pulling action upon the straw passing over the rear end of the cylinder grate 6 and onto the front end of the straw rack 8. By this action, the beater strips the straw from the cylinder 3 and rack 6 and the straw is prevented from winding around the thrashing cylinder. This beater, in addition to stripping the straw from cylinder 3 and rack 6, also exerts a combing action upon the straw passing over the rack 8 so as to release the grain kernels from the straw and permit a considerable portion thereof to pass through the grate 7 and the straw rack 8 into the usual grain receiving means of the thrashing mechanism.

The rotary beater acts to beat the straw downward onto rack 7 and to then thoroughly comb and agitate this straw, thus separating additional grain from the straw. To render this operation even more effective, the blades or paddles on the wings of the beater are positioned diagonally with respect to the axis of the shaft 11 and in such manner that they not only act to press the straw toward the rack 8 and to comb it, thus separating the grain, as described, but also spread it laterally over the rack from the center toward both sides thereof, thus providing for a maximum amount of separation. This operation will be clear from Figures 1 and 2. From Figure 1 it is clear that the blades 14 pass close to the grate 7 and will penetrate the straw upon this grate so as to thoroughly comb and agitate such straw and spread it toward both sides of the rack in the manner stated. This spreading of the straw toward both sides of the rack, and while it is upon the rack, is an important feature of my invention. In thrashing machines, one of the greatest difficulties encountered is that of obtaining uniform distribution of the straw blanket over the straw rack. In thrashing machines using beaters of what may be considered ordinary type, the straw flows toward the center of the rack with the result that a thick blanket of straw passes over the center portion of the rack and the side portions of the rack are not utilized for separating the grain kernels from the straw. This is due, probably, to the impossibility of obtaining uniform distribution of feed of grain to the cylinder. This is a recognized evil in thrashing machines of ordinary type and one which has been accepted as unavoidable. Attempts have been made to overcome this difficulty by providing V-shaped wings on the beater, these wings serving to split the straw stream centrally thereof. The great objection to this is that the straw is crowded toward the sides of the rack so that a heavy straw blanket passes over the rack at each side thereof only, and the central portion of the rack is not utilized for separating the kernels from the straw. This arrangement is even more objectionable than the difficulty encountered in using beaters of ordinary type and in which the straw blanket passes over the central portion of the rack, the side portions of the rack not being utilized. Obviously, it is highly desirable that the entire width of the rack be utilized for separating the kernels from the straw. To obtain this result it is necessary that the straw be distributed uniformly throughout the entire width of the rack so as to be disposed in a thin blanket extending entirely across the rack, this blanket being thoroughly agitated and worked by the rack so as to permit ready passage of the grain kernels through the straw. This result I obtain by providing a beater which not only performs all of the functions of the beater of ordinary construction, but also acts to thoroughly comb and agitate the straw at the forward end of the rack and also acts to distribute the straw uniformly throughout the entire width of the rack. As a result of the particular relation and cooperation between this beater and the cylinder and rack, I obtain greatly improved separation and no portion of the rack is overloaded with other portions thereof bare, as in thrashers employing beaters of ordinary type and associated with the cylinder and rack in the ordinary manner.

As shown, each of the blades or paddles 14 is formed by a suitable metal plate having at its inner end an ear 15 which is riveted or otherwise suitably secured to the wing 10 of the beater, and the body 14 of the blade or paddle extends outward beyond the outer edge of the beater wing.

Figure 2:
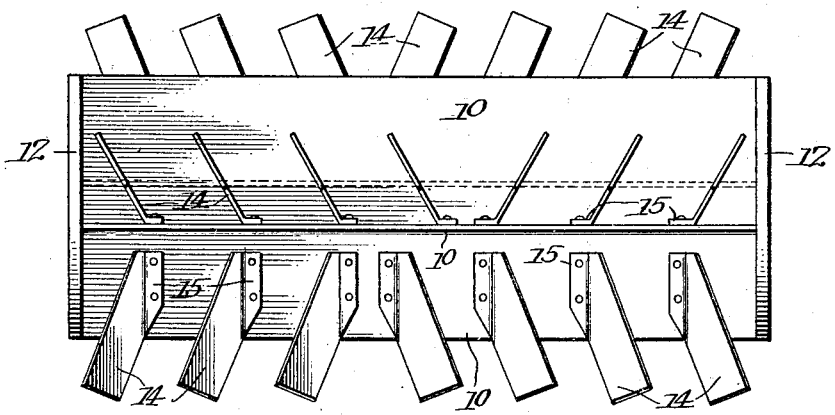
Figure 2 is a plan view of the improved rotary beater, detached.

In the embodiment of the invention illustrated in Figure 2, the blades or paddles attached to each wing are arranged in two groups, the members of each group being oppositely inclined from a point midway in the length of the beater toward both ends. The number of blades or paddles on each wing of the beater will depend upon the size of the machine.

Figure 3:
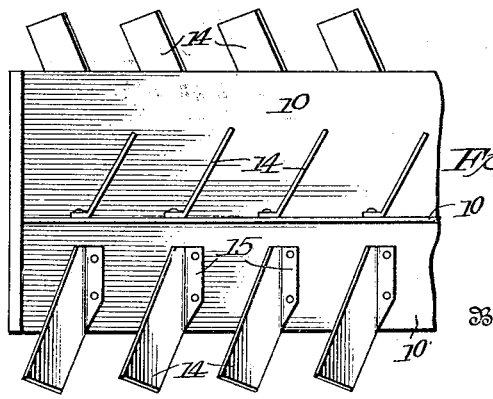
Figure 3 is a view of a slight modification.

Instead of arranging the blades or paddles on each beater wing in two groups, as described, all of those on one wing may be inclined in the same direction, and so arranged that the blades or paddles on alternate wings will be similarly inclined. Such an arrangement is illustrated in Figure 3. With either arrangement it is evident that my improved construction provides a series of right and left blades or paddles projecting beyond and obliquely imposed on beater wings to give an outwardly impelling axis to the straw parallel to the action of rotation and from the center out in both directions, at the same time combing the straw. With the blades of each series staggered relative to the blades of the succeeding series, as shown, a more thorough combing and agitation of the straw, as well as a better spreading thereof, is obtained, as will readily be understood.

It is believed that the advantages of the improvements will be readily understood and appreciated from the foregoing description in connection with the drawing.

It will be seen that by my improvements almost complete separation of grain and straw is effected adjacent the inlet or forward end of the thrashing machine, the blades or paddles on the rotary beater acting to strip the straw from the cylinder and the cylinder grate and to comb and agitate the straw at the forward end of the straw rack, and also to spread it laterally on the rack 8 to effectively thin the straw and separate the grain more readily therefrom. In thrashing machines employing beaters of ordinary type and associated with the rack and the cylinder in the usual manner, the beater performs at most three functions. It strips the straw from the cylinder to prevent winding and carrying over of grain, stops or retards the flying grain and straw projected from the cylinder, and beats the straw down onto the rack. The beater of my invention, associated with the cylinder and the rack in the novel manner illustrated, performs five functions. It strips the straw from the cylinder, stops the flying grain and straw, beats the straw down onto the rack, thoroughly agitates and combs the straw upon the rack at a plurality of points, and spreads the straw upon the rack toward both sides thereof. It is to be noted that the blades penetrate the straw upon the grate 7 beneath the beater at a plurality of points spaced apart transversely of the rack, these blades acting to thoroughly agitate and comb the straw upon the grate. This is highly important, as the greatest amount possible of the kernels should be separated from the straw adjacent the cylinder, to assure efficiency in separation and reduce loss of grain in the straw discharged from the stack. This thorough agitation and combing of the straw upon the rack permits a large portion of the grain kernels to pass through the grate 7 and sent to the grain pan. In addition to combing and agitating the straw on the grate 7, the blades 14, due to their relative disposition, act to spread the straw toward both sides of the rack so as to distribute it uniformly throughout the entire width thereof. In this connection, it is pointed out that by employing a plurality of blades projecting beyond the edges of the respective wings of the beater, the straw is distributed toward both sides of the rack without any splitting of the straw stream in such manner as to leave the central portion of the rack bare. A further advantage is that the straw is spread by the blades while it is upon the forward end of the rack, that is, upon the grate 7, and the blades act positively upon the straw so as to assure uniform spread or distribution thereof. This spreading of the straw, in this manner, when upon the rack, I believe to be broadly new. By employing a beater of the construction illustrated and described, and relating this beater to the straw rack and the cylinder in the manner disclosed, I render it possible to utilize the entire width of the rack for separating purposes and produce a novel combination in which the beater performs all of the functions ordinarily performed by beaters in thrashing machines, and also performs the additional functions of thoroughly combing and agitating the straw upon the grate 7 while also distributing the straw uniformly throughout the entire width of the rack. So far as I am aware, this is broadly new in this art.

It is to be understood that there may be variation in the details illustrated without departing from the invention, and that except where specifically included in the appended claims the invention is not to be understood as being limited to the illustrated embodiment thereof.

What I claim as my invention and desire to secure by Letters Patent is:

1. In combination in a thrashing machine a cylinder, a concave, a straw rack, and a beater disposed adjacent and substantially parallel to the cylinder, said beater comprising a plurality of beater wings and blades projecting beyond the outer edges of the wings and disposed and adapted to comb the straw and spread it laterally toward both sides of the rack.

2. In combination in a thrashing machine a cylinder, a concave, a straw rack, and a beater disposed adjacent and substantially parallel to the cylinder, said beater comprising a plurality of beater wings and blades projecting beyond the outer edges of the wings, certain of the blades being inclined toward one end of the beater and other blades being inclined toward the other end of said beater.

3. In combination in a thrashing machine, a cylinder, a concave, a straw rack, and a beater in rear of the cylinder and above the rack, said beater having blades projecting substantially radially therefrom and arranged in series extending lengthwise of the beater, the blades of each series being disposed in two groups and the blades of one group being inclined toward one end of the beater and the blades of the other group being inclined toward the other end of the beater.

4. A beater for thrashing machines, comprising a plurality of substantially radial beating wings, and combing and spreading blades projecting beyond the outer edges of the wings, certain of said blades being inclined toward one end of the beater and other blades being inclined toward the other end of the beater.

5. A beater for thrashing machines, comprising a plurality of substantially radial beating wings, and combing and spreading blades secured to the wings and projecting beyond the outer edges thereof, certain of said blades being inclined toward one end of the beater and other blades being inclined toward the other end of the beater.

6. A beater for thrashing machines, comprising a plurality of substantially radial beating wings, and combing and spreading blades projecting beyond the outer edges of the wings, and disposed in series lengthwise of the beater, each series of blades being arranged in two groups, the blades of one group being inclined toward the adjacent end of the beater and the blades of the other group being inclined toward the other end of the beater.

7. A beater for thrashing machines, comprising a plurality of substantially radial beating wings, and combing and spreading blades projecting beyond the outer edges of the wings, and disposed in series lengthwise of the beater, each series of blades being arranged in two groups, the blades of one group being inclined toward the adjacent end of the beater and the blades of the other group being inclined toward the other end of the beater, the blades of each series being in staggered relation to the blades of the next succeeding series.

8. In a thrashing machine, in combination, a cylinder and concave, a straw rack, and a beater above the rack and adjacent the cylinder, said beater having a plurality of wings and a plurality of blades projecting therefrom, the beater being so disposed and the blades being so related that the blades strip the straw from the cylinder and also enter the straw upon the rack beneath the beater and comb and agitate such straw and spread it over the rack toward both sides thereof.

9. In a thrashing machine, in combination, a cylinder and concave, a straw rack, and beater means above and adjacent the rack and also adjacent the cylinder, said means having a plurality of wings and blades projecting therefrom and being disposed and adapted to strip the straw from the cylinder and to enter the straw upon the rack at a plurality of points spaced apart transversely thereof and to comb the straw upon the rack and spread it toward both sides of the rack.

10. In a thrashing machine, in combination, a cylinder and concave, a straw rack, and a beater above the rack and adjacent the cylinder, said beater comprising wing members substantially parallel to the beater axis and a plurality of blades projecting outwardly beyond the wing members and spaced apart lengthwise thereof, said blades being disposed to strip the straw from the cylinder and to enter the straw upon the rack beneath the beater so as to comb such straw at a plurality of points and thoroughly agitate it.

11. In a thrashing machine, in combination, a cylinder and concave, a straw rack, and a beater above the rack and adjacent the cylinder, said beater comprising wing members substantially parallel to the beater axis and a plurality of blades projecting outwardly beyond the wing members and spaced apart lengthwise thereof, said blades being disposed to strip the straw from the cylinder and to enter the straw upon the rack beneath the beater so as to comb such straw at a plurality of points and thoroughly agitate it, the blades being also disposed to spread the straw upon the rack toward both sides thereof.

12. In a thrashing machine, in combination, a cylinder and concave, a straw rack, and a beater above the rack and disposed in the path of materials discharged from the cylinder and concave, said beater comprising wing members disposed lenghtwise thereof and a plurality of blades projecting outwardly beyond the wing members and spaced apart lengthwise thereof, said blades being disposed to strip the straw from the cylinder and to enter the straw upon the rack beneath the beater at a plurality of points spaced apart transversely of the rack.

13. In a thrashing machine, in combination, a cylinder and concave, a straw rack, and a beater above the rack and disposed in the path of materials discharged from the cylinder and concave, said beater comprising wing members disposed lengthwise thereof and a plurality of blades projecting outwardly beyond the wing members and spaced apart lengthwise thereof, said blades being disposed to strip the straw from the cylinder and to enter the straw upon the rack beneath the beater at a plurality of points spaced apart transversely of the rack, the blades being also disposed to spread the straw upon the rack toward both sides thereof.

14. In a thrashing machine, in combination, a cylinder and concave, a straw rack, and a beater above the rack and adjacent and parallel to the cylinder, said beater comprising wing members substantially parallel to the axis of the beater and a plurality of blades projecting outwardly beyond the wing members and spaced apart lengthwise thereof, said blades being disposed to strip the straw from the cylinder and to enter the straw upon the rack beneath the beater at a plurality of points spaced apart transversely of the rack so as to thoroughly comb and agitate such straw.

15. In a thrashing machine, in combination, a cylinder and concave, a straw rack, and a beater above the rack and adjacent and parallel to the cylinder, said beater comprising wing members substantially parallel to the axis of the beater and a plurality of blades projecting outwardly beyond the wing members and spaced apart lengthwise thereof, said blades being disposed to strip the straw from the cylinder and to enter the straw upon the rack beneath the beater at a plurality of points spaced apart transversely of the rack so as to thoroughly comb and agitate such straw, said blades being also disposed to spread the straw upon the rack toward both sides thereof.

16. In a thrashing machine, in combination, a cylinder and concave, a straw rack, and a beater above the rack and adjacent and parallel to the cylinder, said beater comprising straight wing members parallel to the axis of the beater and a plurality of blades projecting outwardly beyond the wing members and spaced apart lengthwise thereof, said blades being disposed to strip the straw from the cylinder and to enter the straw upon the rack beneath the beater and to exert a combing action upon such straw and spread it toward both sides of the rack.

17. In a thrashing machine, in combination, a cylinder and concave, a straw rack, and a beater above the rack and adjacent and parallel to the cylinder, said beater comprising straight wing members parallel to the axis of the beater and a series of blades associated with and projecting outwardly beyond the respective wing members, certain of said blades being inclined toward one end of the beater and certain other blades being inclined toward the other end of the beater, said beater being so disposed that the blades strip the cylinder and enter the straw upon the rack beneath the beater.

18. In a thrashing machine, in combination, a cylinder and concave, a straw rack, a grate at the forward end of the rack, and a beater above the grate and adjacent and parallel to the cylinder, said beater comprising wing members extending lengthwise thereof and a plurality of blades projecting outwardly beyond the wing members and spaced apart lengthwise thereof, said blades being disposed to strip the cylinder and to enter the straw upon the grate at a plurality of points spaced apart transversely of the rack and to thoroughly comb and agitate such straw.

19. In a thrashing machine, in combination, a cylinder and concave, a straw rack, a grate at the forward end of the rack, and a beater above the grate and adjacent and parallel to the cylinder, said beater comprising wing members extending lengthwise thereof and a plurality of blades projecting outwardly beyond the wing members and spaced apart lengthwise thereof, said blades being disposed to strip the cylinder and to enter the straw upon the grate at a plurality of points spaced apart transversely of the rack and to thoroughly comb and agitate such straw, said blades being also disposed to spread the straw upon the grate toward both sides of the rack.

20. In combination in a thrashing machine, a cylinder, a concave, a straw rack, and a beater in rear of the cylinder and above the rack, said beater having means acting to strip the cylinder and to comb and agitate the straw upon the rack and spread it from the center toward both sides of the rack, comprising a plurality of outwardly extending inclined blades secured to the beater at intervals lengthwise and circumferentially thereof in the form of groups, the blades of the groups adjacent one end of the beater being inclined toward such end, and the blades of the groups adjacent the other end of the beater being inclined toward the latter end thereof.

In testimony whereof I have hereunto set my hand.

JAMES E. HILL.